3,004,988
3-(SALICYLAMINO)COUMARINS AND THEIR PREPARATION

Janet N. Paige, St. Louis, Mich., assignor to The Dow Chemical Company, Midland, Mich., a corporation of Delaware
No Drawing. Filed Feb. 13, 1959, Ser. No. 792,993
4 Claims. (Cl. 260—343.2)

The present invention is directed to 3-salicylamino coumarin and substituted 3-salicylaminocoumarins, corresponding to the formula

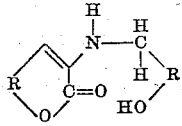

In this and succeeding formulas in the present specification and claims, R is an orthoarylene radical of the benzene series. The term "orthoarylene radical of the benzene series" is used to designate a bivalent radical selected from the group consisting of phenylene and substituted phenylene whereof the available valence bonds arise from adjacent carbon atoms. In those compounds in which the phenylene group is substituted, the substituents thereupon may comprise alkyl, phenalkyloxy, alkyloxy, haloalkyl, hydroxyalkyl, of which each alkyl group contains from one to four carbon atoms, halogen, amino, hydroxy, and phenoxy.

The present compounds are crystalline solids, soluble in many common organic solvents, such as the lower alkanols, liquid chlorinated hydrocarbons, and acetone, and of very low solubility in water, aliphatic hydrocarbon liquids, and aqueous alkali. They are useful as parasiticides and bactericides and are especially adapted to be employed as insecticides.

The novel compounds may be prepared by the reduction of the corresponding 3-(salicylideneamino)coumarin corresponding to the formula

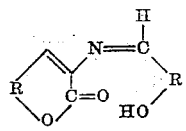

The reduction may be carried out in various manners, but is accomplished promptly and in good yield when employing sodium borohydride ($NaBH_4$) as reducing agent. Good results are obtained when employing approximately two molecular proportions of the borohydride reducing agent with each molecular proportion of the 3-(salicylideneamino)coumarin. The reaction takes place smoothly at temperatures in the range of 30°–100° C., and conveniently in a solvent or non-solvent liquid reaction medium which is essentially non-reactive with the said reactants at the said temperature range. Desirably, a reaction medium may be chosen which boils at a temperature in the said reaction temperature range so that the temperature of the reaction mixture may be limited by such boiling temperature; also, desirably, the reaction medium may be water-miscible, permitting the easy separation of the present products by dilution with water of the reaction mixture. In general, single or mixed absolute alkanols containing from one to four carbon atoms meet these desired characteristics.

In one convenient method of carrying out the reaction, the salicylideneaminocoumarin compound is heated under inert gas blanketing, and with stirring, in a lower alkanol, to which may then be added a reducing agent, dispersed in an inert liquid which also may be, for example an absolute alkanol of the sort described, to prepare a reaction mixture. The combining of the reactants is preferably carried out dropwise and with stirring and heating at a temperature within the reaction temperature range. Heating and stirring are thereafter continued for a period of time to carry the reaction to completion. Thereafter, the resulting reaction mixture may be diluted with, for example, water, whereupon the desired product usually precipitates in and may be removed by filtration from the resulting liquid medium and thereafter further purified as by washing, recrystallization, and the like. Alternatively, when a water immiscible reaction medium is employed, the reaction mixture may be washed with water and gently warmed to evaporate part of the reaction solvent, whereupon the desired product precipitates in remaining solvent and is recovered therefrom by filtration, decantation and the like.

The following example illustrates the invention, but is not to be considered as limiting it.

Example

Sodium borohydride, $NaBH_4$ (2.8 grams; 0.0756 mole), dissolved in 20 grams absolute methanol, was added portionwise and with stirring to 10 grams (0.0378 mole) 3-(salicylideneamino)coumarin suspended in 150 milliliters absolute methanol which was heated at 55°. Upon completion of the addition, the resulting reaction mixture was heated at the boiling temperature, about 65° C., and under reflux for 10 minutes. Thereafter the resulting mixture was cooled and then diluted with an equal volume of water, whereupon the desired 3-salicylamino-coumarin precipitated in and was separated by filtration from the diluted mixture. The product was a crystalline solid of a light yellow color, melting in the range of 168°–172° C. It was readily soluble in acetone, moderately soluble in ethanol, and of very low solubility in liquid hydrocarbons and in water.

In similar reduction preparations, other products of the present invention are prepared as follows:

From 7-amino-3-(4-aminosalicylideneamino)coumarin, a 7-amino-3-(4-aminosalicylamino)coumarin.

From 7-benzyloxy-5,8-dimethoxy-3-(4-benzyloxy-3,6-dimethoxysalicylideneamino)coumarin, a 7-benzyloxy-5,8-dimethoxy-3-(4-benzloxy-3,6-dimethoxysalicylamino)coumarin product.

From 6,8-bis chloromethyl-3-(3,5-bischloromethylsalicylideneamino)coumarin, a 6-8-bischloromethyl-3-(3,5-bischloromethylsalicylamino)coumarin product.

From 6,8-bis hydroxymethyl-3-(3,5-bis hydroxymethylsalcylideneamino)coumarin, a 6,8-bis hydroxymethyl-3-(3,5-bis hydroxymethylsalicylamino)coumarin product.

From 8-bromo-3-(3-bromosalicylideneamino)coumarin, an 8-bromo-3-(3-bromosalicylamino)coumarin product.

From 6-bromo-3-(5-bromosalicylideneamino)coumarin, a 6-bromo-3-(5-bromosalicylamino)coumarin product.

From 8-chloro-3-(3-chlorosalicylideneamino)coumarin, an 8-chloro-3-(3-chlorosalicylamino)coumarin product.

From 6-chloro-3-(5-chlorosalicylideneamino)coumarin, a 6-chloro-3-(5-chlorosalicylamino)coumarin product.

From 6-chloro-8-fluoro-3-(5-chloro-3-fluorosalicylideneamino)coumarin, a 6-chloro-8-fluoro-3-(5-chloro-3-fluorosalicylamino)coumarin product.

From 6,8-dichloro-3-(3,5-dichlorosalicylideneamino)coumarin, a 6,8-dichloro-3-(3,5-dichlorosalicylamino)coumarin product.

From 6,8-dibromo-3-(3,5-dibromosalicylideneamino)coumarin, a 6,8-dibromo-3-(3,5-dibromosalicylamino)coumarin product.

From 5,8-dimethyl-3-(3,6-dimethylsalicylideneamino) coumarin, a 5,8-dimethyl-3-(3,6-dimethylsalicylamino) coumarin product.

From 8-ethoxy-3-(3 - ethoxysalicylideneamino)coumarin, an 8-ethoxy-3-(3-ethoxysalicylamino)coumarin product.

From 8-fluoro-3-(3-fluorosalicylideneamino)coumarin, an 8-fluoro-3-(3-fluorosalicylamino)coumarin product.

From 7-hydroxy-3-(4-hydroxysalicylideneamino)coumarin, a 7-hydroxy-3-(4- hydroxysalicylamino)coumarin product.

From 8-methoxy-3-(3-methoxysalicylideneamino)coumarin, an 8-methoxy-3-(3-methoxysalicylamino)coumarin product.

From 6-methyl-3-(5-methylsalicylideneamino)coumarin, a 6-methyl-3-(5-methylsalicylamino)coumarin product.

The present compounds are useful as insecticides. For such use, the compounds may be dispersed upon an inert finely divided solid and the resulting preparation employed as a dust. Also, such preparations may be dispersed in water with or without a wetting agent and the resulting aqueous dispersions used as sprays. In other procedures the compounds may be employed in organic solvents, or as a constituent of solvent-in-water or water-in-solvent emulsions or as aqueous dispersions thereof which may be applied as spray, drench, or wash; also, the compounds may be dispersed on a nutritive or non-nutritive insect attractant and the resulting preparations employed as insect bait poisons. In a representative operation, a known number of southern army worms was caused to feed upon foliage of young bean plants upon whose surfaces remained the residue produced by evaporative drying of a thorough wetting of the said leaves by an aqueous dispersion containing one half of one percent of 3-(salicylamino)coumarin by weight of ultimate composition. The resulting ingestion of the said coumarin compound caused an almost complete kill of the said army worms, whereas no deaths occurred in a control test, among a similar number of army worms which fed upon similar bean plants treated in the same manner except that the said coumarin compound was not employed. The 3-(salicylideneamino)coumarins employed as starting reactants may be prepared by contacting glycine and salicylaldehyde or a substituted salicylaldehyde corresponding to the formula

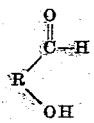

Good results are obtained when reacting approximately two molecular proportions of the salicylaldehyde reactant with each molecular proportion of glycine. Conveniently the reaction is caried out in a liquid reaction medium, which may advantageously be glacial acetic acid, or a butanolmethylene chloride mixture. The reaction takes place smoothly at temperatures in the range of 50°–100° C. with preparation of the 3-(salicylideneamino)coumarin compound and water of reaction.

Various modifications of the process and products of the present invention may be made without departing from the spirit or scope thereof, and it is to be understood that I limit myself only as defined in the appended claims.

I claim:

1. The salicyl-3-amino coumarins corresponding to the formula

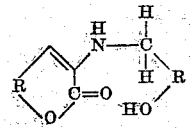

wherein each R represents a member of the group consisting of orthophenylene and substituted orthophenylene, in which the substituents are selected from the group consisting of halogen, amino, hydroxy, phenoxy, alkyl, phenalkyloxy, alkyloxy, haloalkyl and hydroxyalkyl, and the alkyl moieties in said substituents being of from 1 to 4 carbon atoms, inclusive.

2. 3 - (salicylamino)coumarin corresponding to the formula

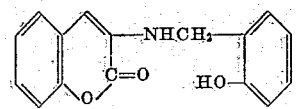

3. The method of preparing salicyl-3-amino coumarins corresponding to the formula

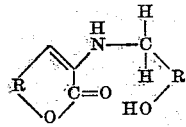

wherein each R represents a member of the group consisting of orthophenylene and substituted orthophenylene in which the substituents are selected from halogen, amino, hydroxy, phenoxy, alkyl, phenalkyloxy, alkyloxy, haloalkyl and hydroxyalkyl, said alkyl moieties being of from 1 to 4 carbon atoms, inclusive, which comprises the steps of contacting at temperatures of from 30° to 100° C., alkali metal borohydride and salicylidene-3-aminocoumarin corresponding to the formula

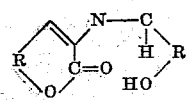

4. A method of preparing 3-(salicylamino)coumarin which comprises the steps of contacting at a temperature of from 30° to 100° C. an alkali metal borohydride and 3-(salicylideneamino)coumarin, and thereafter separating 3-(salicylamino)coumarin corresponding to the formula

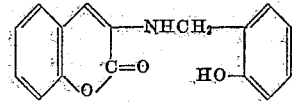

No references cited.